Oct. 17, 1933.  C. F. SCOTT  1,930,886
MOUSE TRAP
Filed Feb. 6, 1933
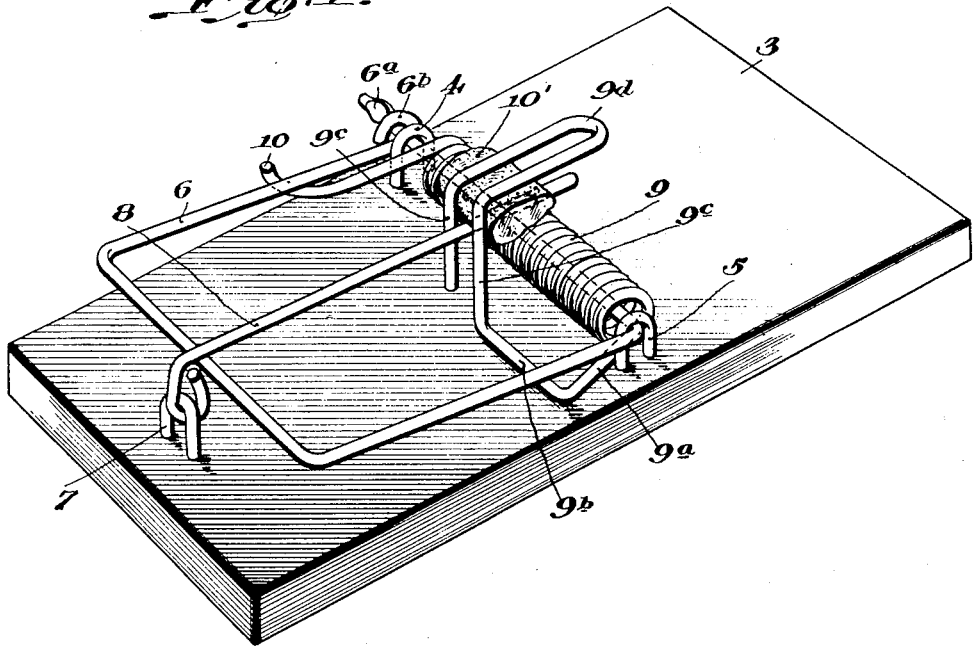
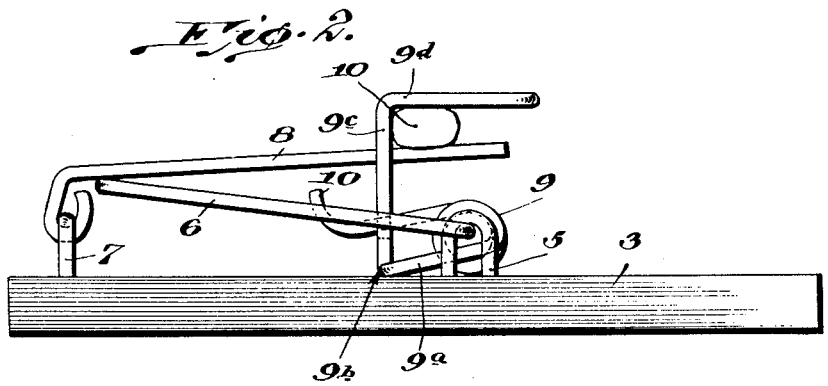
WITNESS
INVENTOR
Chester F. Scott,
BY
ATTORNEYS Patented Oct. 17, 1933

1,930,886

UNITED STATES PATENT OFFICE 1,930,886

MOUSE TRAP

Chester F. Scott, Manayunk, Pa.

Application February 6, 1933. Serial No. 655,486

3 Claims. (Cl. 43—81)

My invention relates to improvements in mouse traps, and it consists in the combinations, constructions and arrangements herein described and claimed.

One of the objects of the invention is to provide an improvement in that type of mouse tray in which a coiled spring is mounted on a support for actuating a wire loop normally held in operative position by means of a keeper which latter is held at one end by the bait itself, and in which, when the bait is eaten away by the rodent, the keeper is released to spring the trap. There are traps of this type, but those with which I am familiar have separate parts, such as abutment members which have to be fashioned as by stamping or otherwise, and also have to be attached to the support as by rivets or screws, a construction which increases the cost of the trap.

Another object of my invention is to provide a trap in which the cost is reduced to a minimum by utilizing the wire of which the spring is made to serve as an abutment against which the bait may be held and to also serve as a guide member for the keeper.

A further object is to reduce the expense by obviating the necessity of locating and securing the abutment member to the base or support.

Other objects and advantages will appear in the following specification, and the novel features of the invention will be particularly pointed out in the appended claims.

My invention is illustrated in the accompanying drawing forming part of this application, in which:

Figure 1 is a perspective view of the trap in set position, and

Figure 2 is a side elevation thereof.

In carrying out my invention I provide a support or base 3 upon which are staples 4 and 5 respectively. These members form bearings for a rectangular loop 6 which constitutes the jaw member for engaging the body of the mouse. As will be seen from the drawing, one end of the loop 6 is flattened as shown at 6a and extends through a loop 6b which forms a collar to position the loop pivotally in the staple bearings.

A third staple 7 forms a pivotal bearing for the keeper 8, the latter having a loop at its end, as shown in the drawing. A spiral spring 9 has one end 10 passed underneath the loop 6, as shown in Fig. 1. This spring surrounds the pivotal portion of the loop 6. The opposite end of the spring is bent laterally at 9a, thence along the surface of the support 3, as shown at 9b, thence upwardly to form one of a pair of guide members 9c. These guide members 9c have a connecting U-shaped portion 9d, which constitutes an abutment, as hereinafter described.

It will be noted in the construction of this device that when the loop 6 is swung to position shown in Fig. 1, it flexes the spring so that the parts 9a, 9b, 9c, are held against the support 3, and do not require any securing means. This is true of the end of the guide member 9c, which bears on the support.

From the foregoing description of the various parts of the device, the operation thereof may be readily understood. In setting the trap, the loop 6 which is normally on the right side in Fig. 1, that is to say when the trap has been sprung, is turned on its pivotal portion against the tension of the spring end 10, and the keeper 8 is brought in between the arms of the U-shaped portion 9d. The bait 10' is then placed underneath the U-shaped portion and above the keeper. The trap is now set. When the mouse eats the bait away the tension of the spring will cause the loop 6 to force the keeper upwardly between the sides of the U-shaped abutment portion 9b, throwing the keeper toward the left in Fig. 1, while the jaw portion comprising the loop 6 will suddenly turn on its pivots and engage the body of the mouse to hold it.

During this movement the keeper will be guided by the portions 9c so that it is impossible for it to hang on the U-shaped abutment. It will also be noted that the prolongation of the wire, of which the spring is made, serves to fashion the guide members 9c and also the abutment member 9d against which the bait is held when the trap is set. This construction can be made very cheaply since it is merely a question of bending the wire. It does not require specially formed abutment members nor the attachment of the same to the base.

Since the question of the commercial success of a device depends largely upon the low cost of the device without sacrificing any of its functions, it will be seen that for a trap of this type I have reduced the cost to the minimum, making it entirely of wire except for the wooden base.

While I have described and illustrated the invention as applicable to a mouse trap, it will be understood that it could be made of any size, and could be used for catching larger animals than mice.

I claim:

1. A mouse trap comprising a base, a jaw member having a portion pivotally mounted on said base, a coiled spring surrounding the pivotal portion of the jaw and having one end engaging said jaw, the other end of the coiled spring being bent to form guide members and an abutment member, and a keeper for said jaw arranged to enter between the guide members and to be held below said abutment member by bait inserted between the keeper and the abutment member.

2. A mouse trap comprising a base, a jaw member having a portion pivotally mounted on said base, a coiled spring surrounding the pivotal portion of the jaw and having one end engaging said jaw, the other end of the coiled spring being bent to engage the base, then being bent to form parallel guide members and a U-shaped abutment member substantially parallel to the base, and a keeper pivotally mounted on the base and having an end arranged to extend between the parallel guide members and between the arms of the U-shaped abutment to a position below the said abutment whereby the keeper may be held by bait disposed above the keeper and below the abutment.

3. A mouse trap comprising a base portion, a rectangular wire loop pivotally mounted on said base portion, a coiled spring surrounding a portion of the loop and having one end bearing on the loop, the other end of the coiled spring being bent laterally, thence along the surface of the support, thence upwardly, thence horizontally, thence at a horizontal position back upon itself, thence downwardly and terminating at the base, and a keeper pivotally mounted on said base and arranged to enter between the upwardly extending portions and between the horizontal portions to a position below said horizontal portions, whereby the keeper may be held in position by bait disposed above the keeper and below said horizontal portions.

CHESTER F. SCOTT.